United States Patent [19]

Weis et al.

[11] 4,364,614
[45] Dec. 21, 1982

[54] REMOVAL METHOD FOR REMOVABLE CLOSURE MEMBER FOR BEARING UNITS

[75] Inventors: Siegfried K. Weis, Byron Center; Donald T. Truszkowski, Grand Rapids, both of Mich.

[73] Assignee: C. L. Frost & Son, Inc., Grand Rapids, Mich.

[21] Appl. No.: 165,292

[22] Filed: Jul. 2, 1980

[51] Int. Cl.³ .......................... F16C 33/78; F16C 33/80
[52] U.S. Cl. .............................. 308/187.1; 308/187.2; 220/285; 220/305
[58] Field of Search ................. 308/187.1, 187.2, 36.1, 308/36.2, 189 R, 188; 301/37 R; 104/172 S; 220/305, 285, 284

[56] References Cited

U.S. PATENT DOCUMENTS

| | | |
|---|---|---|
| 28,725 | 6/1860 | Andrews et al. |
| 1,321,724 | 11/1919 | Eilers |
| 1,776,641 | 9/1930 | Smith |
| 2,123,025 | 7/1938 | Ramirez ........................... 301/37 R |
| 2,148,995 | 2/1939 | Nelson |
| 2,493,366 | 1/1950 | Simcich |
| 2,606,791 | 8/1952 | Specht |
| 2,617,698 | 11/1952 | Gaines |
| 2,659,229 | 11/1953 | Skillman et al. |
| 2,717,808 | 9/1955 | Onsen et al. |
| 2,853,771 | 9/1958 | Melville |
| 2,941,768 | 6/1960 | Elms ..................................... 248/71 |
| 3,064,982 | 11/1962 | Stephens |
| 3,303,957 | 2/1967 | Walter ................................. 220/284 |
| 3,395,950 | 8/1968 | Brandt |
| 3,602,150 | 8/1971 | Frost et al. ....................... 104/172 S |
| 3,877,604 | 4/1975 | Brown ................................. 220/284 |

*Primary Examiner*—Lenard A. Footland
*Attorney, Agent, or Firm*—Price, Heneveld, Huizenga & Cooper

[57] ABSTRACT

A removable end cap closure member or welsh plug for bearing units is disclosed including a frangible knockout plug adapted to be broken out of the closure member with an impact tool to provide an aperture allowing removal of the closure member with a tool. In the preferred embodiment, the plug remains attached to the closure member by a bendable connecting neck which prevents lodging of the plug in the bearing unit.

Also disclosed is a bearing assembly including the removable end cap closure member as well as a method for removing the closure member including pressing the knockout plug with a tool to provide an aperture in the closure member and prying and bending the closure member away from the bearing unit with a tool inserted in the aperture. A fixture for supporting a trolley wheel and trolley bracket assembly during installation and removal of an end cap closure member to and from such an assembly is also disclosed.

5 Claims, 7 Drawing Figures

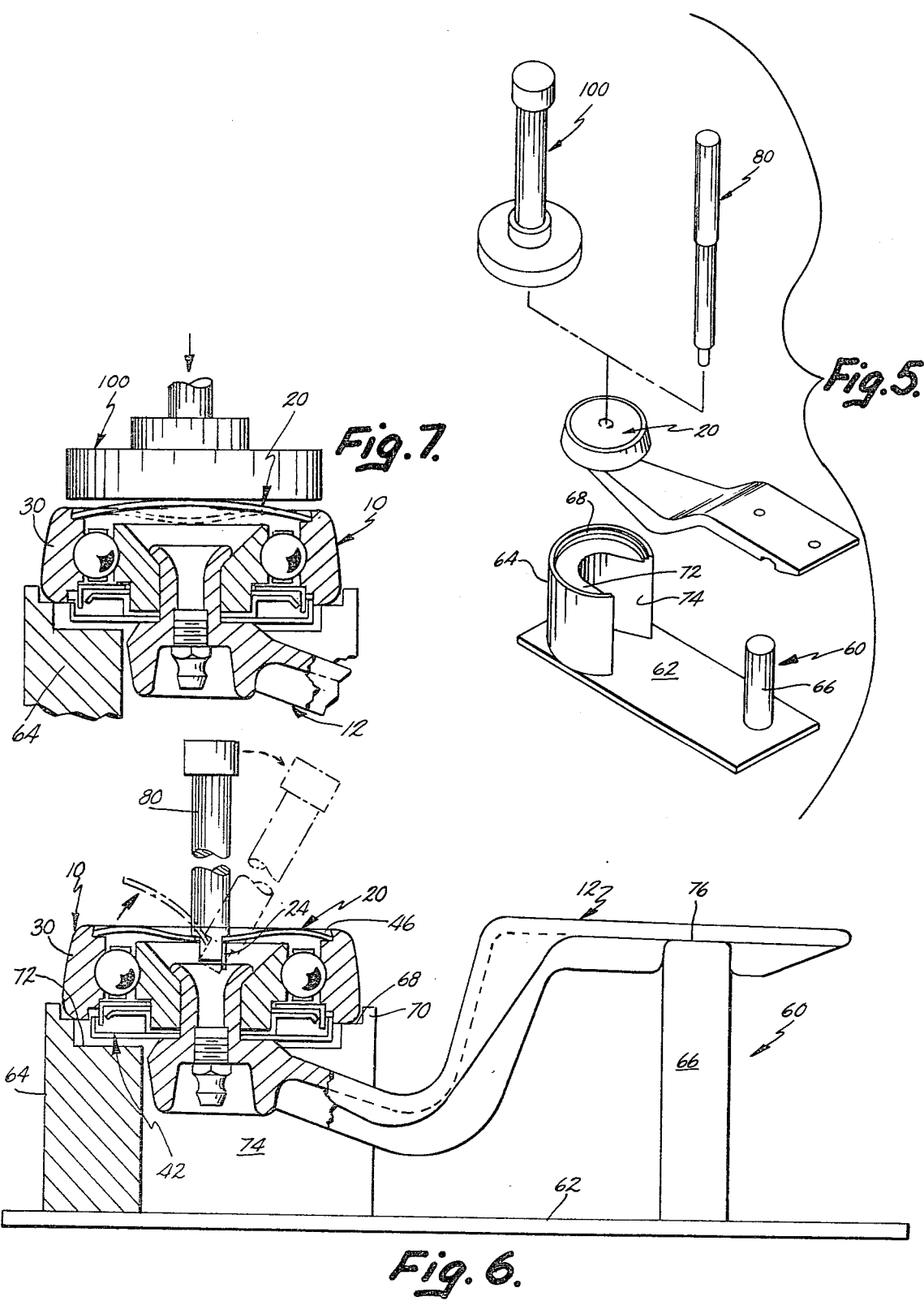

REMOVAL METHOD FOR REMOVABLE CLOSURE MEMBER FOR BEARING UNITS

BACKGROUND OF THE INVENTION

The present invention relates to end cap closure members or welsh plugs adapted for mounting on bearing units, e.g., trolley wheels used in overhead conveyors and the like and, more particularly, to an improved welsh plug or closure member which provides a positive closure, easier removal from a bearing unit, and reuse of the bearing unit.

The invention also relates to a method for removing a welsh plug or closure member of the type disclosed in the present invention and a tool for supporting a trolley wheel and trolley bracket assembly during installation or removal of an end cap closure member or welsh plug to or from the wheel.

It is conventional to provide welsh plugs or end cap closure members substantially permanently mounted on conveyor wheels or other bearing units. Such closure members are designed to exclude dirt and other foreign matter from the interior of the bearing unit as well as to retain grease or lubricants within the bearing unit during operation. In order to reduce repair and maintenance costs, certain users of bearing units and conveyor wheels desire to remove the end cap closure members or welsh plugs from the bearing units for purposes of repair, inspection or routine maintenance on the bearings. The removal of the closure member enables inspection, cleaning of parts and relubrication of the bearing assembly in a manner which, often times, obviates the need for complete replacement of the assembly.

Various removable closure members have been used in the past including a disc-like welsh plug fitted in a recess on the outer race of a bearing unit and retained on the outer race by an annular snap or split ring received in a retaining groove adjacent the recess in which the closure member is fitted. While such structures have adequately prevented contamination of bearings and retention of grease therewithin, it is necessary to provide approximately a one-sixth greater amount of material in the outer race to accommodate the mounting structure for such split ring closure members, in addition to the greater expense involved in manufacturing and assembling two pieces on each bearing unit. Moreover, corrosion or other degradation of the snap ring, retaining grooves, or the closure member itself can make removal of such structures very difficult.

Other welsh plugs or closure members are substantially permanently mounted by pressing them into corresponding recesses on the outer races of bearing units. In order to provide a secure closure of the bearing unit, a tight fit must be accomplished. When removal of such closure members is desired, it has typically been necessary to remove the grease fitting from the head of the trolley bracket, and drive a rod or other implement through the inner race opening against the closure member from the opposite side of the assembly. Such a procedure is time consuming and often results in damage to one or more parts of the bearing assembly preventing its reuse. Moreover, such disassembly of a trolley bracket from the trolley wheel is often impossible when a riveted or swaged type assembly of the bracket to the wheel inner race is used.

Alternately, such closure members have been removed by driving a sharp implement into the surface of the installed closure member and using the implement to remove the closure member. This too has often caused damage to parts of the bearing structure, is difficult to perform, requires a sharpened tool, and many times ruins the tools used to make such a removal. If, in fact, the implement is driven entirely through the closure member, metal fragments can often be expelled into the bearing assembly which could cause premature failure of the unit if it is reused.

In addition, it was often difficult to support the bearing units or trolley wheels during removal of the closure members. Casual support on any available flat surface during the above-described procedures often resulted in indentation of the rolling element race surfaces. Such "Brinelling" occurred from the impact between the race surfaces and the harder, more wear resistant rolling elements. Reuse of the assembly was then impossible.

Accordingly, the present invention was conceived in recognition of and as a solution for the above problems with previously known end cap closure members or welsh plugs and methods for removing same.

SUMMARY OF THE INVENTION

The present invention provides a removable end cap closure member or welsh plug for bearing units having a frangible portion adapted to be broken out of the closure member with an impact tool to provide an aperture allowing removal of the closure member from the bearing unit with a tool inserted in the aperture. The invention also encompasses a bearing assembly including such a closure member, and a method for removing such a closure member from a bearing unit.

In one aspect of the invention, the closure member is an imperforate piece of sheet material having an exterior edge of a predetermined peripheral shape and frangible means in the piece for breaking upon application of a predetermined force thereagainst to provide an aperture through the closure member which facilitates removal of the member after installation on a bearing unit. In a preferred embodiment, the frangible means include an impressed outline or coined impression extending partially through the sheet metal to define a knock-out plug. The preferred member also includes a bendable connection for retaining the knock-out plug to the remainder of the sheet material when the plug is broken away from the sheet material to prevent lodging of the plug in the bearing assembly. In addition, the preferred closure member is a convex, circular disc which is adapted to expand slightly radially outwardly to provide an interference fit with a bearing unit upon its installation.

In yet another aspect of the invention, a method for removing an imperforate closure member mounted on one side of the outer race means of a bearing unit is defined wherein the closure member includes a frangible knock-out portion. The method includes supporting the bearing assembly while impacting the knock-out portion with a tool to break the portion away from the closure member and form an aperture therethrough. The closure member is then pried away from the bearing unit by bending it with a tool inserted in the aperture.

The present invention, accordingly, provides a removable closure member or welsh plug for bearing units which is totally imperforate both before and after installation on a bearing unit and which provides a tight, secure closure preventing entry of foreign matter into the bearing unit as well as retention of lubricant within the bearing. The closure member, including its knock-out portion, is entirely sufficient to resist even the most severe grease blowout pressure in the event there was a clog in any relief channel during relubrication of a bearing including the member. Yet, the frangible knock-out portion allows fast, trouble free removal of the welsh plug without damage to the rolling element support races, or any other parts of the bearing assembly. This enables reuse of the bearing assembly following insertion of a new closure member or welsh plug.

In addition, the present invention overcomes the prior known problems of removing imperforate welsh plugs or closure members designed for substantially permanent installation, especially in assemblies wherein the trolley bracket is riveted or swaged to a trolley wheel. Accordingly, the present invention provides reproducible results and allows reuse of bearing assemblies in an inexpensive, trouble free, efficient manner.

These and other objects, advantages, purposes and features of the invention will become more apparent from a study of the following description taken in conjunction with the drawings.

BRIEF DESCRIPTION OF THE DRAWINGS

FIG. 5 is a perspective, exploded view of the installation and removal fixture of the present invention and the impact tools for insertion and removal of a closure member to or from a bearing unit;

FIG. 6 is a side elevation of the installation and removal fixture of the present invention, including a trolley wheel and trolley bracket assembly having a closure member with a frangible knock-out plug of the present invention mounted thereon, shown partially in section and illustrating in phantom the method for removing the closure member from the trolley wheel; and FIG. 7 is a fragmentary, sectional side elevation of the trolley wheel and trolley bracket assembly during installation of a closure member of the present invention on the outer race of the trolley wheel.

DESCRIPTION OF THE PREFERRED EMBODIMENTS

Figure 1:
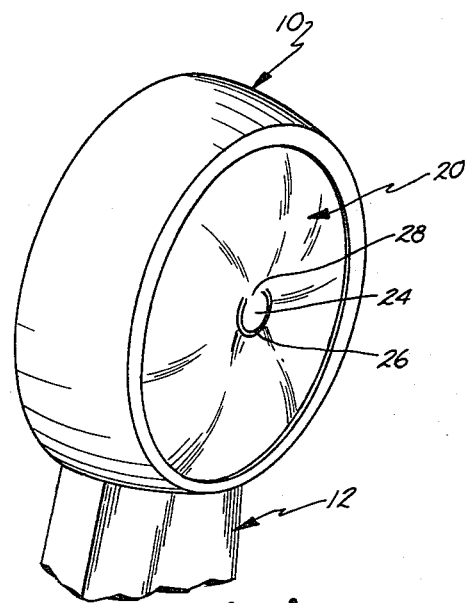
FIG. 1 is a fragmentary perspective view of one form of a conveyor trolley wheel including the end cap closure member or Welsh plug of the present invention.

Referring now to the drawings in greater detail, FIGS. 1-4 illustrate the preferred embodiment 20 of the end cap closure member or Welsh plug of the present invention. Closure member 20 is designed for insertion on one side of the outer race of a bearing unit 10. In this view, bearing unit 10 is a trolley wheel assembly having a sloped peripheral surface of the type typically used in overhead conveyors. The closure member, however, may be used in other bearing units to provide protection against entry of dirt, dust, water and other foreign matter to the interior of the bearing unit and to retain grease, oil or other lubricants within the bearing assembly. As is conventionally known, the trolley wheel bearing unit 10 is designed for use with a trolley bracket 12 of the type used in overhead conveyor systems (see FIG. 2).

Figure 3:
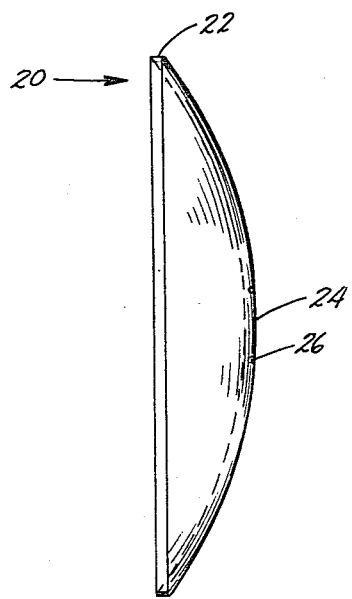
FIG. 3 is a side view of the closure member or Welsh plug of the present invention prior to installation on a bearing unit.

As is best seen from FIGS. 1 and 3, the end cap closure member 20 is preferably a circular disc of sheet metal stamped into a convex or crowned configuration. Although sheet metal is preferred, other sheet materials may be used to form this closure member as long as they are sufficiently rigid to be retained adequately within a mounting structure of a bearing assembly, and as long as they are impervious to lubricants and foreign matter such as dirt, water and dust. In the preferred embodiments, the sheet metal used for the invention has a thickness within the range of about 0.024–0.075 inches. Preferably, the radius of curvature of the crowned or convex curvature prior to installation of the closure member in a bearing unit is approximately 2.75 times the radius of the circular periphery or circumference of the disc 20 itself.

When pressed into place with an interference fit as shown in FIG. 1, the closure member 20 is deformed out of its crowned or convex shape into a complex or sinuous curvature by means of an "oil canning" effect which pushes the peripheral edges outwardly into tight, secure engagement with the surrounding mounting area of the outer race of the bearing unit. Although a circular peripheral shape is preferable, it is possible that, depending on the type of mounting area on a bearing unit, other shapes such as elliptical, square, rectangular or others could be used as an overall shape for the closure member.

As viewed in FIG. 3, the peripheral edge surface 22 of the disc or closure member 20 prior to installation is generally cylindrical. Planes tangential to the edge surface 22 are perpendicular to the plane of the sheet metal from which the disc is stamped or crowned initially. That edge is also perpendicular to the plane of the bottom edge of the disc. This relationship is preferably produced by forming the crowned or convex shape of the closure member while the member is part of a larger sheet of metal or other material, followed by stamping the crowned or convex shape out of the remainder of the sheet metal providing the perpendicular edge. When installed, the closure member takes on its "oil canned" or complex curvature and edge 22 becomes a conical surface and extends at a slight inward angle matching that of the annular, generally axially extending surface of a recess in the outer race in which it is designed to be mounted.

In order that the closure member may be removed after installation, it is provided with a knock-out portion or plug 24 defined by a frangible, impressed outline 26 in the shape of a partial circle and located at the center of the disc or member 20. The outline 26 is actually a partially circular, coined impression struck approximately one-half way through the thickness of the sheet metal as shown in FIG. 3. The thickness of the material left in the groove of the outline is calculated in a conventional manner to allow breakage of the partially circular outline upon being struck or impacted by a predetermined force sufficient to break the knock-out plug away from the remainder of the closure member.

To prevent the knock-out plug 24 from fracturing completely away from member 20, and to prevent its becoming lodged within a bearing assembly on which the closure member is designed to be installed, a bendable connecting neck 28 is provided as a bridge between the knock-out plug 24 and the remainder of the closure member 20. The connecting neck 28 interrupts the circular outline 26, preferably has the full thickness of the sheet material, but has a width sufficiently small to allow the knock-out plug to be bent either inwardly or outwardly away from the remainder of the member and to provide a substantially circular opening through the closure member. The resulting opening allows the insertion of a tool which can then be used to pry or bend the closure member away from the remainder of the bearing unit and be completely removed from the bearing as is more fully described below.

Although the circular shape for the outline 26 is preferred, other shaped outlines such as square, rectangular or elliptical could be used. Thus, until the frangible outline is broken by impacting the knock-out plug 24, closure member 20 remains imperforate and impervious to the escape of lubricants from within a bearing assembly or to the entry of dirt and foreign matter into the assembly.

In a preferred embodiment of the closure member, sheet metal having a thickness of 0.036 inches is used while the member has a circular peripheral shape having a diameter of approximately 1.86 inches. The radius of curvature of the convex shape is approximately 2.56 inches. The knock-out plug 24 has a diameter of approximately 0.31 inches while the connecting neck is 0.08 inches wide or approximately two times that of the metal thickness of the closure member. The frangible outline 26 extends approximately one-half way through the sheet material leaving approximately 0.018 inches of material left to be broken upon removal of the closure member. In other embodiments, the groove thickness remaining after forming the frangible outline is between 0.010 and 0.020 inches, depending on the impact force desired for knocking out and bending the plug for removal of the closure member.

Figure 2:
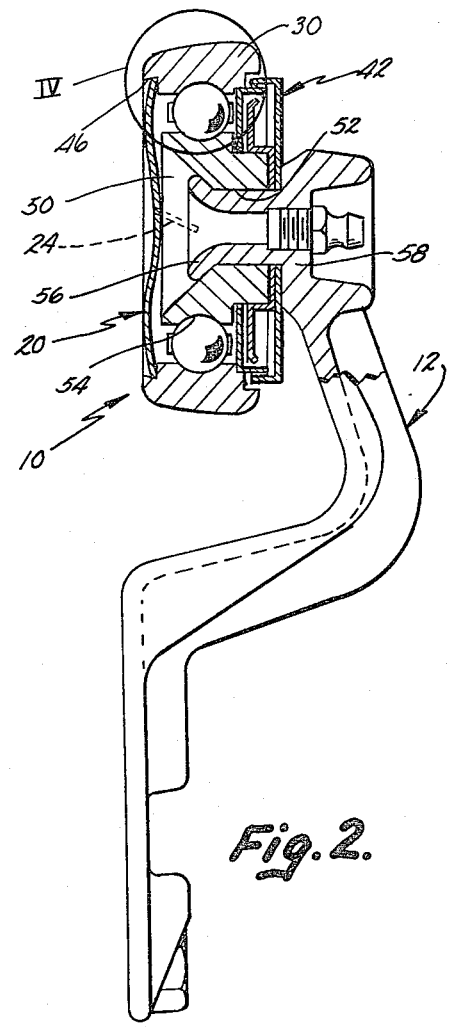
FIG. 2 is a side view of a trolley wheel and trolley bracket assembly, shown partially in section, and illustrating the knock-out plug of the closure member in its bent position in phantom.
Figure 4:
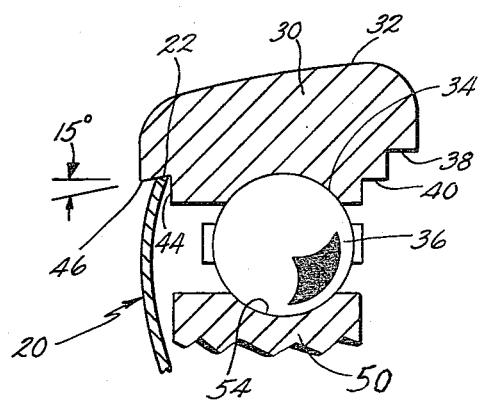
FIG. 4 is a fragmentary, enlarged side sectional view of the trolley wheel assembly of FIG. 2 including the present closure member.

Assembly of the closure member 20 to a typical bearing unit is best seen in FIGS. 2 and 4. Bearing assembly 10, shown here in the form of an overhead conveyor trolley wheel, includes an outer race 30, including a sloped outer circumference 32 designed to roll substantially vertically on the surface of a lower flange of an I-beam support track (not shown). Outer race 30 also includes an outer raceway 34 contoured to the shape of ball or roller bearing elements 36. On the side of the outer race 30 closest to the trolley bracket 12 are a series of concentric annular recesses 38, 40 which either receive or allow insertion of appropriate portions of a labyrinth seal assembly 42. Portions of the labyrinth seal assembly 42 are mounted on the inner race while at least one portion, as shown in FIG. 2, is mounted in recess 40 and is the innermost seal member.

On the opposite side of outer race 30 away from the trolley bracket 12 is an annular recess 44 including an annular, generally axially extending surface 46. It is against the entire annular surface 46 which the edge 22 of closure member 20 is designed to engage in an interference fit as shown in FIG. 4. Preferably, surface 46 extends inwardly at an approximate 15° angle to the central axis of the wheel assembly to resist outward movement of the closure member 20. As mentioned above, edge 22 is substantially parallel to surface 46 when installed, and thus also extends at an approximate 15° angle to the central axis of the wheel assembly after closure member 20 is installed and assumes its complex, sinuous curvature as shown in FIG. 2. When closure member 20 has a diameter of approximately 1.86 inches as mentioned above, the base or largest diameter of shoulder surface 46 is approximately 1.91 inches.

Other portions of the trolley wheel assembly 10 include inner race member 50 including a central bore 52 and an inner raceway 54 spaced radially inwardly from outer raceway 34 and receiving ball or roller bearing elements 36 therebetween.

Trolley bracket 12 includes a rivet projection 56 extending from its head 58 which is formed over or swaged against the conical interior surface of inner race 50 to retain the trolley wheel assembly on the trolley bracket. The body of the trolley bracket 12 extends outwardly and downwardly from the wheel unit to extend around the I-beam track for supporting the unit and to engage and support objects therefrom.

When installed, closure member 20 closes and seals the entirety of one side of the trolley wheel assembly on which surface 46 is included. The closure member fits tightly and securely against surface 46 because of its interfering relationship and the "oil canning" effect during installation which forces edge 22 outwardly against surface 46. The closure member turns with the outer race 30 and does not engage any portion of the inner race although its central area is approximately tangential with the plane of the side surface of the inner race member on the side of the closure member. Because of the conical recession in the inner race, however, no engagement occurs with the closure member. As can be seen in FIG. 2, impacting and bending knockout plug 24 downwardly from the closure member is allowed because of the clearance room provided by the conical area in the inner race and the hollow nature of the rivet head. However, even if a bolted connection was used with the trolley bracket and trolley wheel, sufficient clearance room for bending of the knock-out plug inwardly would be provided without damage to the other parts of the assembly.

As noted above, the above mounting arrangement provides a tight secure interference fit which retains lubricant and prevents entry of foreign matter because of the imperforate closure member 20. Approximately one-sixth less material is required in the outer race due to this mounting method than with other known methods. However, removal of the closure member can be easily made for relubrication or repair of the bearing assembly while using the fixture support and method described hereinafter.

Referring to FIGS. 5-7, a preferred fixture for supporting a trolley wheel and trolley bracket assembly for either installation of or removal of an end cap closure member or welsh plug is shown. Fixture 60 includes a generally planar, metal base 62, a generally cylindrical, upstanding support 64 at one end thereof, and a generally cylindrical, upstanding bracket support 66 at the other end. The central axes of cylindrical supports 64, 66 are generally perpendicular to base 62. Wheel support 64 includes an upper, annular, generally planar surface 68 for engaging and supporting only the outer race of a trolley wheel assembly or bearing unit such as that shown and described at 10 herein. An integral annular shoulder 70 is provided around the periphery of surface 68 to confine and locate the outer race of the trolley wheel on surface 68. Below and within surface 68 is a recessed surface 72 provided for clearance of the labyrinth seal assembly 42 on trolley wheel assembly 10. In addition, a generally U or V-shaped clearance space or aperture 74 extending through the side of the cylindrical wheel support 64 closest to trolley bracket support 66 in alignment with the central axes of supports 64, 66 and provides room for receiving the trolley bracket head and arm extending toward support 66.

At the other end of base 62 is the trolley bracket support post 66 which extends perpendicularly to the base. Post 66 includes an upper support surface 76 sloping slightly away from wheel support 64 to engage a surface of the trolley bracket 12 as shown in FIG. 6.

As will be understood from FIG. 6, the combined trolley wheel and trolley bracket assembly is designed to be supported on the fixture 60 with closure member 20 facing upwardly and the opposite side of outer race member 30 resting on surface 68 such that the central or rotational axis of the wheel assembly is perpendicular to the base 62. Only the outer race engages the wheel support 64 while only a portion of the trolley bracket spaced away from wheel support 64 engages support post 66. Support of only the outer race of the bearing unit prevents transfer of force from the closure member through balls 36 to the raceways of the unit when struck or impacted during removal of the closure member as described below. The prevention of such force transfer prevents "Brinelling" or indenting of the balls into the raceways which would otherwise occur if force were applied through the closure member to other parts of the assembly. This allows the reuse of the bearing after insertion of a fresh closure member. Support of a portion of the trolley bracket by post 66 enables application of a prying or bending force using tool 80 as shown in FIG. 6 without the wheel and bracket assemblies pivoting or slipping off the fixture.

As will now be apparent, once the trolley wheel and bracket assembly is supported as shown in FIG. 6 on fixture 60, an elongated impact tool 80 may be used to strike, fracture and bend knock-out plug 24 out of the closure member resulting in an aperture through which the tool may be inserted within the assembly. The shape of the lower end of tool 80 is matched to the shape of the knock-out plug but is slightly smaller. Preferably, the end of tool 80 has a reduced diameter, cylindrical portion which has a diameter slightly smaller than the diameter of the outline or coined impression 26. This prevents fracture of the bendable connection or neck 28 when the tool is struck with a hammer or other force applying object.

When the lower end of tool 80 is aligned with the knock-out plug 24 so that it is not over connecting neck 28, a hammer may be used to strike the upper end of tool 80, fracture the outline or coined impression 26 and bend knock-out plug 24 downwardly and inwardly of the bearing assembly as shown in FIGS. 2 and 6. Such action leaves the knock-out plug connected to the remainder of the closure member by the connecting neck 28 so that it does not become lost within the bearing assembly where it could cause damage. Since the impact tool 80 is normally struck in a position perpendicular to the general plane of closure member 20, and parallel to the axis of rotation of wheel 10, breakage and bending of the knock-out plug leaves the tool projecting upwardly with its lower end inserted through the resulting aperture. Thereafter, the upper end of tool 80 is moved away from its perpendicular or normal position as shown in FIG. 6 so that the tool end inserted through the aperture extends under an edge of the aperture and pries or bends the portion of the closure member which is in radial alignment with that aperture edge away from the bearing assembly outer race (see FIG. 6). A tool other than tool 80 may also be inserted in the knock-out aperture for the above removal. Thus, after such bending and prying, which does not engage or damage any other portions of the bearing assembly, the closure member may be removed from the assembly and discarded.

After inspection, cleaning and/or relubrication of the bearing unit or trolley wheel, a new closure member 20 may be inserted in recess 44 and against surface 46 as shown in FIG. 7. The trolley wheel and bracket assembly is supported on fixture 60 in the manner shown in FIGS. 6 and 7. A new closure member 20 having a convex, crowned shape is placed in recess 44 and the planar lower surface of an installation tool 100 is placed atop the crowned member. Thereafter, the tool 100 may be struck with a hammer resulting in an "oil canning" of the closure member as described above and as shown in phantom in FIG. 7. This forces the peripheral edge of a new closure member 20 out against surface 46 and locks the closure member securely in place on the outer race.

Accordingly, the present invention provides a welsh plug or end cap closure member designed for easy, trouble-free removal in an efficient manner. The removal prevents contamination of the bearing assembly to be reused while saving time and providing more consistent maintenance results than with prior known removable closure members.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows:

1. A method for removing an imperforate closure member mounted on one side of the outer race means of a bearing unit, said closure member including a frangible knock-out portion therein, said method including the steps of:
   (1) supporting said bearing assembly on a rigid surface with said closure member facing in an accessible direction;
   (2) providing a tool for impacting said knock-out plug;
   (3) impacting said knock-out portion with said tool to break said portion away from said closure member to form an aperture through said closure member; and
   (4) prying said closure member away from said bearing unit by bending said closure member with a tool inserted in said aperture.

2. The method of claim 1 including supporting only the outer race means of said bearing assembly on the side of said assembly opposite to said one side of said assembly.

3. The method of claim 1 including bending said knock-out portion inwardly toward said bearing assembly with said tool while leaving said plug connected to a portion of said closure member adjacent said aperture.

4. The method of claim 3 including impacting and bending said knock-out portion with a tool whose shape generally matches, but is slightly smaller than, said knock-out portion.

5. The method of claim 1 including inserting a first portion of said tool a substantial distance into said aperture in a position generally perpendicular to the plane of said aperture and moving a second portion of said tool which extends out of said aperture away from said perpendicular position such that said first tool portion extends under an edge of said aperture to enable the portion of said closure member adjacent and in radial alignment with said aperture edge to be pulled away from said bearing assembly outer race means.

* * * * *